Feb. 21, 1956   J. R. COX   2,735,687
CAM-OPERATED CHUCK

Filed Oct. 19, 1953   2 Sheets-Sheet 1

INVENTOR.
JOHN R. COX
BY

Feb. 21, 1956   J. R. COX   2,735,687
CAM-OPERATED CHUCK
Filed Oct. 19, 1953   2 Sheets-Sheet 2
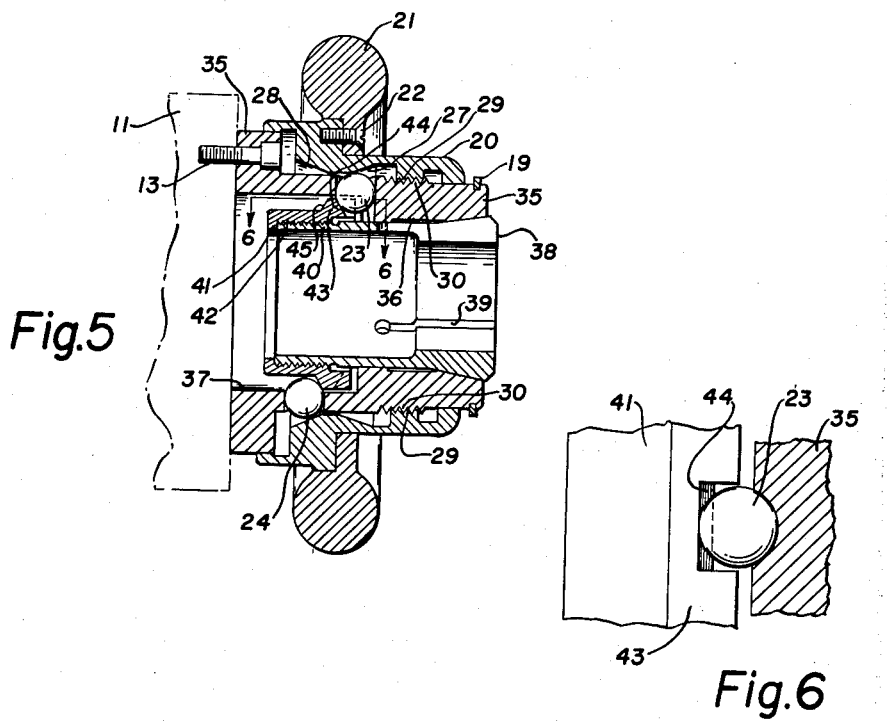
Fig.5
Fig.6
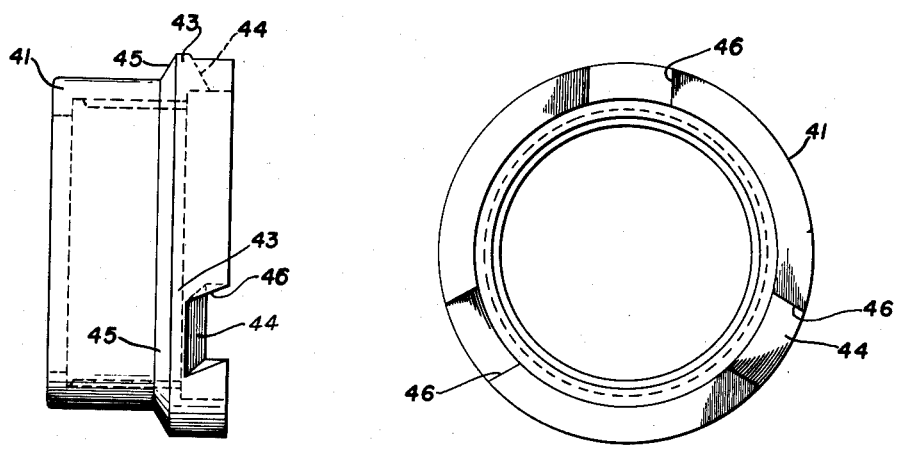
Fig.7
Fig.8
INVENTOR.
JOHN R. COX
BY

United States Patent Office 2,735,687
Patented Feb. 21, 1956

2,735,687

CAM-OPERATED CHUCK

John R. Cox, Cleveland, Ohio

Application October 19, 1953, Serial No. 386,806

10 Claims. (Cl. 279—51)

My invention relates to chucks for holding tools, workpieces and the like.

An object of my invention is to provide an improved construction in a chuck for efficient and facile operation of the chuck.

Another object is the provision of a chuck having a revolvable operating member which when turned in one direction releases a collet in the chuck and when turned in an opposite direction closes or compresses the collet in the chuck.

Another object is the provision for improved means for operating the chuck through the medium of balls or roller members movable in the chuck.

Another object is the provision of a chuck that is economical in construction and efficient in use.

Another object is the provision of a chuck operating in an improved manner and with a minimum of working parts to provide the required results.

Still another object is the provision of an improved collet utilizable in a chuck for the actuation of the collet.

A further object is the provision of an improved construction of a collet.

Another object is the provision of an adapter to be mounted on the collet for the actuation of the collet.

Other objects and a fuller understanding of the invention may be had by referring to the following description and claims, taken in conjunction with the accompanying drawings, in which:

Figure 5 is a longitudinal, sectional view of a modified form of my invention;

Figure 6 is an enlarged view of a portion of the modified form of my invention shown in Figure 5 and taken in the direction of the arrows 6—6 of Figure 5;

Figure 7 is an enlarged elevational view of the adapter utilized in the modified form of my invention shown in Figure 5; and Figure 8 is an enlarged endwise view of the adapter utilized in the modified form of my invention shown in Figure 5.

Figure 1:
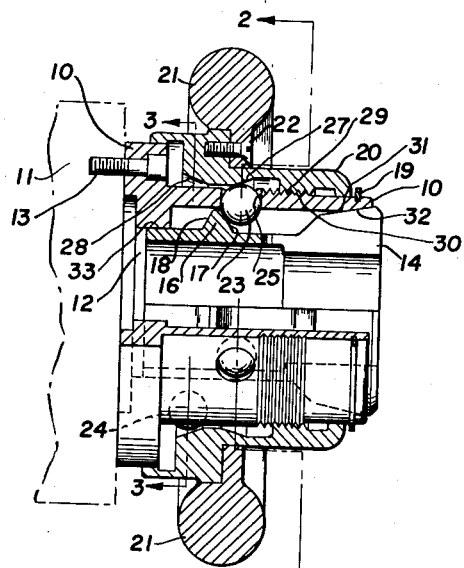
Figure 1 is a longitudinal, sectional view of a chuck embodying my invention and taken through the line 1—1 of Figure 2.

My chuck includes a base member 10 which is mounted to a support or foundation 11 of a machine or other device to which the chuck is attached, the base member being mounted by means of the bolts 13. There is an axially disposed open space 12 in the base member 10, this open space providing a centrally disposed bore in the base.

A collet 14 is centrally disposed within the bore of the base 10 so as to reciprocate therein. The base 10 has a sliding guide portion 33 adjacent its rearward end to provide for sliding guidance of the collet in its reciprocation.

There are three slots 15 in the collet 14 so as to provide three resilient fingers which are compressible by the coaction of the external conical surface 32 of the collet and the internal conical surface 31 of the base 10 adjacent the forward end thereof. Rearward movement of the collet causes the fingers to compress and to thus close the collet and forward movement of the collet permits the fingers to expand and to thus open the collet.

Extending radially outward from the outer cylindrical wall of the collet is an actuating bead or cam portion 16. This bead 16 has a forward inclined face or camming surface 17 and a rearward inclined face or camming surface 18, the surfaces 17 and 18 being inclined toward each other. This camming portion 16 is annular and runs around the circumferential extent of the collet. The base 10 has three openings 25 in which are disposed respectively balls or roller members 23 arranged so that the balls 23 may move radially inward and outward with respect to the base 10. There is another set of three openings 26 in which are disposed respective balls 24 similarly arranged so as to be movable radially inward and outward relative to the base 10. The forward balls 23 are disposed in one plane transverse of the chuck and the rearward balls 24 are disposed in another plane which is parallel to the first mentioned plane and spaced rearwardly therefrom.

An operating member or outer shell 20 is mounted upon and embraces the base 10. The operating member 20 has internal threads 29 which threadably engage external threads 30 on the base 10. A handwheel 21 is secured to the operating member 20 by means of the screws 22. By revolving the handwheel 21, the operating member 20 is revolved so that the operating member 20 moves axially forward and rearward of the base, depending upon the direction of rotation. By revolving the handwheel 21 in one direction, the threaded interengagement of the parts causes the operating member 20 to move forwardly, whereas by revolving the handwheel 21 in an opposite direction causes the operating member 20 to move rearwardly. A spring clip or retaining ring 19 prevents the operating member 20 from being accidently moved too far forward and off of the base 10.

The operating member 20 has an internal wall spaced from the external wall of the base 10. This internal wall of the operating member 20 has two major portions, one major portion of which comprises the forwardly inclined camming surface 27 and the other major portion of which comprises the rearwardly inclined camming surface 28. These camming surfaces 27 and 28 are inclined at an angle to each other and face in opposite axial directions.

The arrangement is such that upon turning the operating member 20 in one direction, the forward balls 23 are pressed radially inward against the surface 17 by the inclined camming wall 27. At the same time the rearward balls 24 are moved radially outward by the surface 18, this radially outward movement being permitted by the relief given by the inclined camming wall 28. This radially inward movement of the forward balls 23 against the surface 17 of the actuating bead 16 causes the collet 14 to be moved rearwardly of the base and hence to compress or close the collet.

Upon revolving the operating member 20 in an opposite direction, the forward balls 23 may move radially outward because of the relief afforded by the inner wall of the operating member and at the same time the rearward balls 24 are pressed radially inward against the surface 18 of the actuating bead 16 and this moves the collet 14 forwardly so as to release or open the collet, Thus, the two sets of balls 23 and 24 are alternately moved inwardly and outwardly; as one set of balls moves inwardly the other set of balls moves outwardly. This provides for the reciprocation of the collet and its operation as desired.

In Figures 5 to 8, inclusive, I illustrate a modified form of my device. In this modified form of my device, the base member is similar in some respects to the base member 10 but the internal structure of its bore is somewhat modified. The base member 35 of this modified form of my invention has a sliding guide portion 36, which is in the forward portion of the bore, and the sliding guide portion 33 utilized in base 10 has been omitted. The maximum bore of the base 35 is defined by the wall 37 at the rearward portion of the base 35.

A collet 38 is axially positioned within the base 35 and reciprocal therein. Instead of the actuating bead being integral with the collet, an adapter 41 is threadably engaged to the threaded rear end 40 of the collet 38, by means of the internal threads 42 engaging the threads of the rear end 40.

Figure 2:
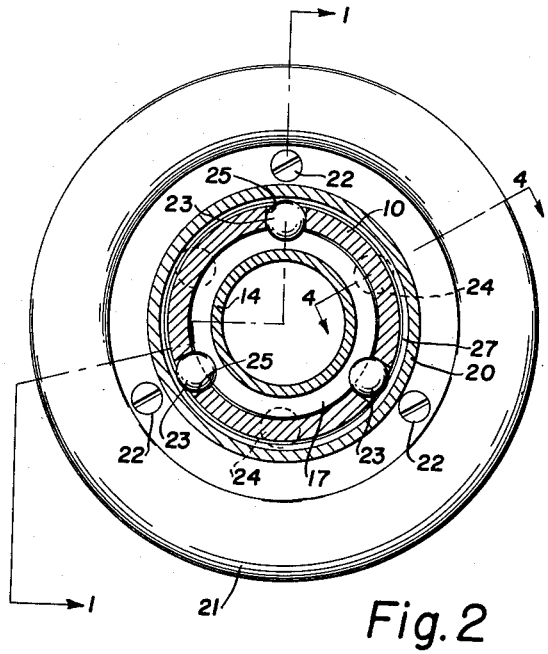
Figure 2 is a cross-sectional view of a chuck embodying my invention and taken through the line 2—2 of Figure 1.
Figure 4:
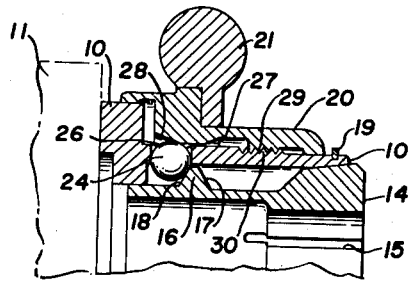
Figure 4 is a partial longitudinal, sectional view taken through the line 4—4 of Figure 2.
Figure 3:
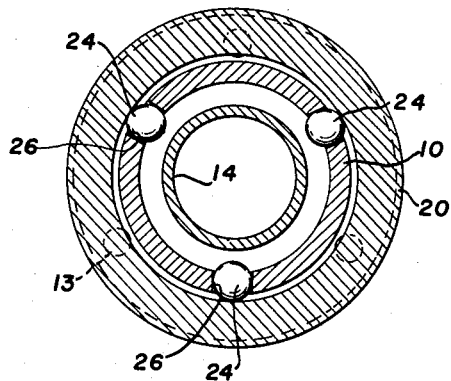
Figure 3 is a cross-sectional view taken through the line 3—3 of Figure 1.

The adapter 41 has a camming portion or bead 43 extending radially outward therefrom in much the same way that the actuating bead 16 extended from the collet in the views of Figures 1 to 4, inclusive.

The forward end of the collet 38 has three slots 39 providing three resilient fingers at the forward end thereof. Coacting complementary conical surfaces of the collet 38 and base 10 provide for the compression and release of the collet as the collet is reciprocated in the base.

The camming portion 43 of the adapter 41 has the rearward inclined surface 45 and the forward inclined surface 44, which are inclined toward each other and facing in opposite axial directions. The forward inclined surface 44 is divided into three portions by means of the notches 45 formed in the forward end of the adapter 41, each notch 45 accommodating a forward ball 23. Except for the fact that the camming portion 43 is detachable from the collet and is secured thereto by the threaded engagement described, the operation of the parts shown in Figures 5 to 8, inclusive, is similar to that described in connection with the preferred form shown in Figures 1 to 4, inclusive.

A standard collet having a threaded rear end may be utilized in this modified form of my invention shown in Figure 5 and the standard collet thus may be utilized in my chuck by means of the adapter 41 secured thereto. Revolving the handwheel 21 will reciprocate and operate the collet in the same way as described in connection with the form of invention shown in Figures 1 to 4, inclusive.

The present disclosure includes the description contained in the appended claims, as well as the foregoing description and the disclosure of the drawings.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A chuck comprising a base having a cylindrical open space disposed therein, a collet disposed in said open space and slidably carried by said base to move axially of said open space, a camming member carried by said collet and extending radially outward therefrom, said collet being movable to open and close upon movement of said camming member, said camming member having a first camming surface and a second camming surface arranged in opposition to each other, an operating member threadably engaged to and embracing said base and arranged to move forwardly and rearwardly of the base, said operating member having a third camming surface and a fourth camming surface arranged in opposition to each other, and first roller means and second roller means carried by said base and movable radially thereof, said first roller means being arranged to be alternately moved radially inward and outward by the first camming surface of the camming member and by the third camming surface of the operating member and said second roller means being arranged to be alternately moved radially inward and outward by the second camming surface of the camming member and by the fourth camming surface of the operating member, the operation of said operating members moving said camming member by movement of said roller means relative to said camming surfaces.

2. A chuck comprising a base having an axially disposed open space therein, a collet positioned in said open space and slidable axially of said base, said collet and base having cooperating tapered surfaces to provide for operation of the collet upon axial movement of the collet, said collet having a bead portion disposed on the outer wall thereof and extending radially of the collet, said bead portion having opposing walls inclined at an angle to each other and radially of the collet, two sets of balls carried by the base and movable radially thereof toward and away from said collet, and an outer member embracing said base and movable relative thereto, said outer member having inwardly thereof opposing surfaces inclined at an angle to each other and radially of the collet, the outer member, balls and collet being such that movement in one direction of the outer member relative to the base moves one set of balls against the bead portion of the collet to move the collet to opening position and movement in another direction of the outer member relative to the base moves the other set of balls against the bead portion of the collet to move the collet to closing position.

3. Apparatus for operating a collet having a bead carried thereon and extending radially therefrom, said bead having opposing walls inclined at an angle to each other and radially of the collet, comprising a base member having an open space therein for accommodating said collet, said base member having a portion slidably engaging said collet to close the collet upon movement of the collet in one direction, a first set of balls and a second set of balls carried by said base member and movable relative thereto and radially of the base member toward and away from said open space, said sets of balls being displaced from each other axially of the base member, and an operating member surrounding and movable relative to said base member, said operating member having inner wall means adapted to engage and press inwardly said balls, said inner wall means being arranged to engage and press inwardly one set of balls upon movement of the operating member in one direction and to engage and press inwardly the other set of balls upon movement of the operating member in an opposite direction, the inward movement of one set of balls causing the said one set of balls to cammingly engage one of the opposing walls of said bead and to move the said collet in one direction, and the inward movement of the other set of balls to cammingly engage the other of the opposing walls of said bead and to move the said collet in an opposite direction.

4. Apparatus for operating a collet having opposed camming surfaces disposed radially outward therefrom and arranged for opening and closing the collet, comprising in combination a base member having a radially disposed open space for accommodating said collet, a first set of roller members and a second set of roller members carried by said base member and arranged for radial movement inward and outward relative to the base member, said sets of roller members being arranged in planes, respectively, disposed transversely of the base member and spaced from each other axially of the base member, and an operating member movably mounted upon said base member to move forwardly and rearwardly thereof, said operating member having an inner wall facing inwardly toward said roller members, said inner wall having a first portion inclined forwardly and arranged to engage one of said sets of roller members and a second portion inclined rearwardly and arranged to engage the other of said sets of roller members, forward movement of said operating member causing said first portion of the inner wall to press said one set of roller members inwardly against one of said opposed camming surfaces, and rearward movement of said operating member causing said second portion of the inner wall to press the other set of roller members inwardly against the other of said opposed camming surfaces, the alternate pressing engagement of the opposed camming surfaces by said sets of roller members opening and closing the collet.

5. A check comprising a collet having disposed on the outer cylindrical wall thereof a camming member, said camming member having a first camming portion and a second camming portion disposed in opposition to each other and arranged to provide for alternate forward and rearward movement of said collet, a base member carrying balls movable radially inward and outward thereof, some of said balls being disposed to engage said first camming portion and others of said balls being disposed to engage said second camming portion, and operating means carried by said base member for alternately moving said some balls radially inward and said other balls radially inward, inward movement of said some balls causing them to engage and press said first camming portion to move the collet in one direction, and inward movement of said other balls causing them to engage and press said second camming portion to move the collet in an opposite direction.

6. A collet adapted to be moved forwardly and rearwardly in a chuck by first and second camming elements carried by the chuck, said collet having formed on the outer wall thereof a ring portion extending radially therefrom, said ring portion having a forwardly inclined camming face engageable by said first camming element and a rearwardly inclined camming face engageable with said second camming element, said faces being inclined toward each other and spaced apart axially of said collet, the alternate engagement of said faces by said camming elements providing for forward and rearward movement of the collet in the chuck.

7. A collet having a cylindrical portion and integral therewith a raised ring portion extending radially outward therefrom, said ring portion having an outer forward face and an outer rearward face, said faces being inclined radially outward toward each other and radially inward in opposite axial directions, said outer faces providing opposed camming surfaces for alternately operated camming elements of a chuck accommodating said collet.

8. An adapter for a collet having a cylindrical portion and a threaded end portion, said adapter being threaded to threadably engage said end portion and to embrace said cylindrical portion, said adapter having a radially outwardly extending raised portion, said raised portion having opposed camming surfaces disposed to incline toward each other and to face in opposite axial directions, said opposed camming surfaces being alternately engageable by camming elements carried by a chuck accommodating said collet.

9. An adapter for a collet having a cylindrical portion, said cylindrical portion having external threads disposed adjacent the rearward end thereof, said adapter having a cylindrical portion having internal threads engageable with the external threads of said collet, said adapter having an enlarged portion extending radially outward from said cylindrical portion, said enlarged portion having opposed camming surfaces inclined toward each other and facing in opposite axial directions, said opposed camming surfaces being engageable, respectively, by alternately operated camming elements carried by a chuck accommodating the collet.

10. Apparatus for operating a collet having opposed camming surfaces disposed radially outward therefrom and arranged for opening and closing the collet, comprising in combination a base member having a radially disposed open space for accommodating said collet, a first set of roller members and a second set of roller members carried by said base member and arranged for radial movement inward and outward relative to the base member, and an operating member movably mounted upon said base member to move relative thereto, said operating member having an inner wall facing inwardly toward said roller members, said inner wall having a first portion and arranged to engage one of said sets of roller members and a second portion and arranged to engage the other of said sets of roller members, movement of said operating member in one direction causing said first portion of the inner wall to press said one set of roller members against one of said opposed camming surfaces, and movement of said operating member in an opposite direction causing said second portion of the inner wall to press the other set of roller members against the other of said opposed camming surfaces, the alternate pressing engagement of the opposed camming surfaces by said sets of roller members opening and closing the collet.

References Cited in the file of this patent

UNITED STATES PATENTS 605,166    Johnson  ---------------- June 7, 1898